April 9, 1929.  A. W. MARSIK  1,708,768
EDGE TRIMMING MACHINE
Filed Dec. 24, 1926   2 Sheets-Sheet 2
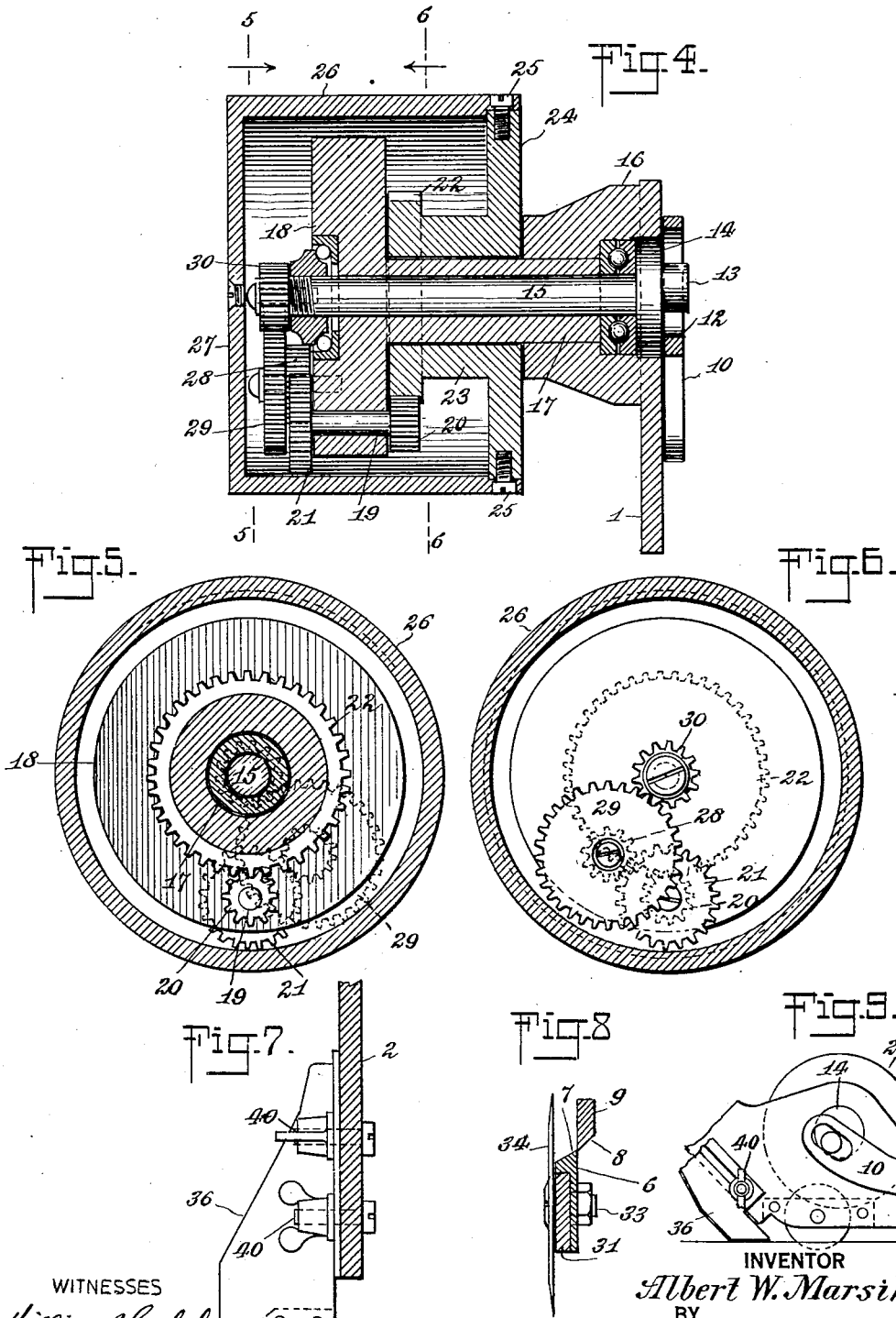
INVENTOR
Albert W. Marsik
BY
Munn & Co.
ATTORNEY
WITNESSES Patented Apr. 9, 1929.

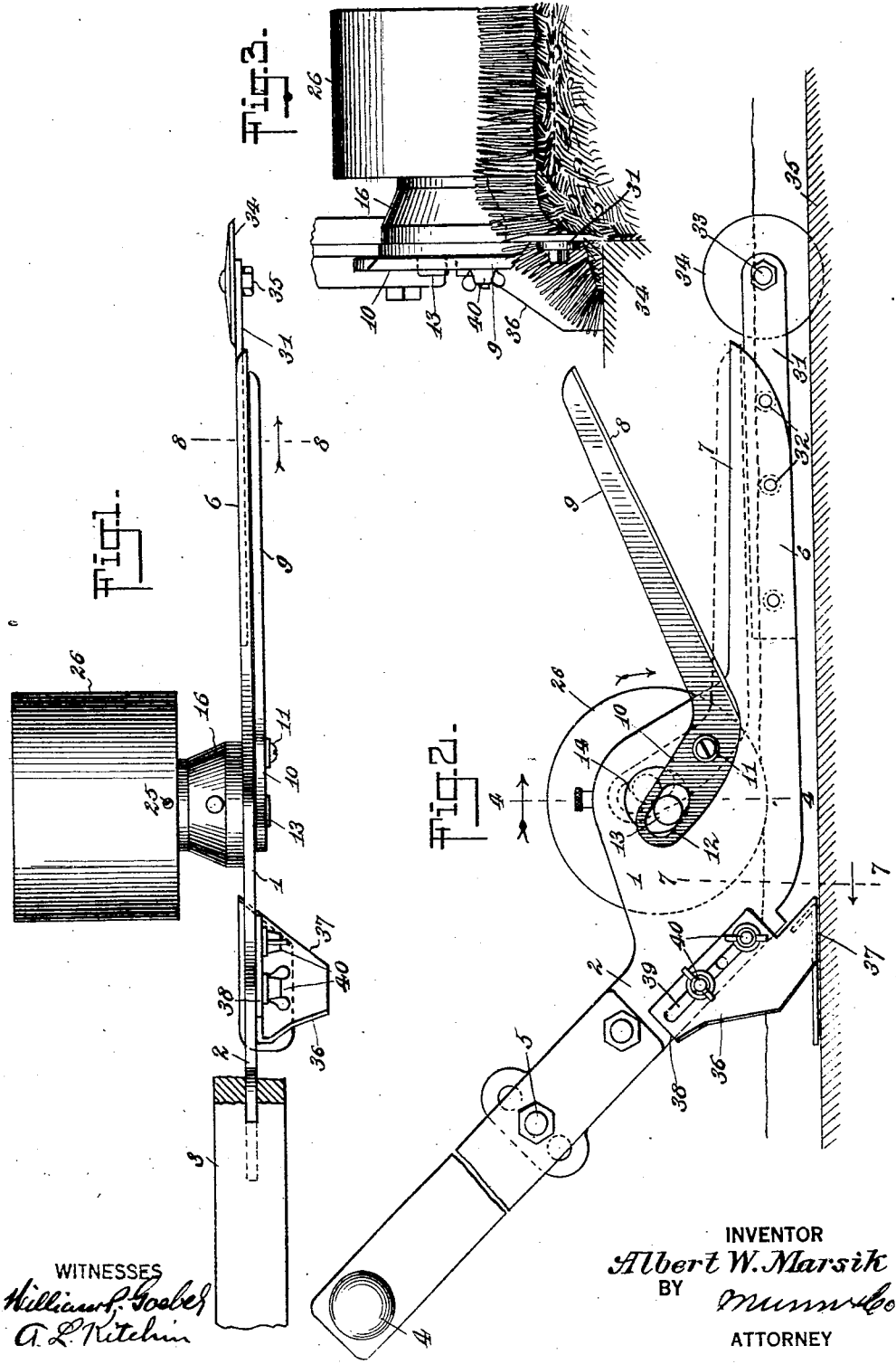

1,708,768

UNITED STATES PATENT OFFICE.

ALBERT W. MARSIK, OF NEW YORK, N. Y.

EDGE-TRIMMING MACHINE.

Application filed December 24, 1926. Serial No. 156,894.

This invention relates to trimming devices for the edges of lawns adjacent walks or pavements and has for an object to provide an improved edge trimming structure which will not only cut or trim the grass but will cut the earth adjacent the pavement and move the cutter off to one side.

Another object of the invention is to provide in a single instrument, means for cutting the grass and plowing to a certain extent some of the soil adjacent the cut grass so as to provide a clean sharp edge to the grass and earth adjacent the walk.

Another object, more specifically, is to provide an edge trimming device for lawns and the like wherein as the device moves over the ground as shearing structure is utilized for cutting the grass while other means are automatically brought into play for removing the cut grass and some of the earth adjacent thereto so as to present a clean edge.

In the accompanying drawings—

Figure 1 is a top plan view of an edge trimming machine disclosing an embodiment of the invention.

Figure 2 is a side view of the machine shown in Figure 1.

Figure 3 is a front view of the structure shown in Figure 2, part of the handle being broken away.

Figure 4 is a sectional view through Figure 2 on line 4—4, the same being on an enlarged scale.

Figure 5 is a sectional view through Figure 4 on line 5—5.

Figure 6 is a sectional view through Figure 4 on line 6—6.

Figure 7 is a fragmentary sectional view through Figure 2 on line 7—7, the same being on an enlarged scale.

Figure 8 is a sectional view through Figure 1 on line 8—8.

Figure 9 is a fragmentary side view showing a modified construction to that illustrated in Figure 2, said view being on a reduced scale.

Referring to the accompanying drawings by numerals, 1 indicates a flat plate which may be termed a body and which merges into an extension 2 for receiving the handle 3, said handle being of any conventional kind, as for instance, a wooden bar with a cross piece 4 at the upper end. This handle is secured in place by suitable bolts 5 whereby the device may be readily pushed along when in use. The body 1 also merges into a forwardly extending knife 6 having a cutting edge 7 co-acting with the cutting edge 8 of the blade 9. These blades are formed and also act as shears for cutting the grass by a shearing action in the same manner as an ordinary pair of scissors. The blade 9 is provided with an extension 10 arranged almost at right angles to the main part of the blade, said extension being pivotally mounted at 11 on body 1 and provided with an elongated slot 12 accommodating the operating or driving pin 13. This pin is eccentrically connected to a disk or plate 14 whereby the pin rotates in a circle as the disk 14 rotates. The disk 14 is carried by a shaft 15 (Figure 4) supported by suitable ball bearings.

As indicated in Figure 4, the body 1 is either integral with or rigidly secured to a block 16 to which a hollow shaft 17 is rigidly secured in any desired manner. The hollow shaft 17 merges into a large disk 18 carrying at one point a rotatable shaft 19, said shaft having secured at one end a pinion 20 and at the opposite end a gear wheel 21. The pinion 20 continually meshes with a gear wheel 22 formed integral with or rigidly secured to the tubular extension 23 of plate 24. The plate 24 is secured by screws 25 or other fastening means to the tubular casing 26, which casing is preferably provided with a closed end 27. The outside of casing 26 may be smooth, corrugated or formed in any desired manner so as to engage the earth and rotate as the device is moved along. As the casing 26 rotates, it will rotate plate 24 and gear wheel 22. This will cause the pinion 20 and gear wheel 21 to rotate. The gear wheel 21 continually meshes with a pinion 28 which is rigidly connected with a gear wheel 29 and gear wheel 29 in turn is continually in mesh with pinion 30 rigidly secured to shaft 15. In this way the rotary movement of casing 26 is multiplied so that upon one revolution of casing 26, shaft 15 and disk 14 will rotate many times. As the pin 13 describes a circle on each rotation of disk 14 and as this pin extends through the slot 12, the knife 9 will be moved upwardly and downwardly once for each rotation of shaft 13. When the knife 19 is forced downwardly, the cutting edge 8 passes the cutting edge 7 in the usual manner of shears so that a good shearing action is secured.

Associated with the knife 6 is a small bar 31 which is preferably countersunk into the plate as shown in Figure 8 and held therein by suitable bolts or rivets 32. The forward end of the bar 31 carries a bolt 33 acting as a journal pin and on this journal pin is rotatably mounted a disk cutter 34. This cutter projects continually below the lower edge of the blade 6 so that it may enter the earth 35 when the device is in operation. At the rear part of body 1 is arranged a cleaning device or plow 36 which has a shearing edge 37, arranged at an angle as shown in Figure 1 whereby the earth at the right of the cutter 34 will be moved to one side. The plow 36 is provided with an upstanding flange member 38 provided with a slot 39 through which the bolts 40 extend, said bolts being fitted into body 1 and provided preferably with wing nuts so that the plow 36 may be adjusted to any desired depth.

In use, the device is specially adapted to cut the edge of a lawn near pavements or walks. When in use, the blade or cutter 34 is arranged adjacent one edge of the walk and the blades 6 and associated parts are arranged parallel to the walk with the casing 26 resting on the grass as shown in Figure 3. The device is pushed along in this position and as it is pushed the blades or cutters 6 and 9 will shear the overhanging grass while blade 34 also acts to shear to a certain extent some of the grass and acts to cut into the earth a short distance. As the plow 36 moves, the cut earth is drawn or crowded to one side, namely, to a point on the walk where it may later be removed. This provides a clean sharp edge to the lawn adjacent the walk.

What I claim is:

1. An edge trimming machine for lawns, comprising a shearing structure which includes a knife merging into a body, a blade pivotally mounted on said body formed with an edge co-acting with the edge of said knife, traction operated means for actuating said blade, a handle for moving said traction operated means and said shearing structure along, means for cutting the earth, said means including a bar secured to said knife and extending beyond the front end thereof and a rotatable disk knife, and a plow structure for throwing to one side the cut earth and also the cut grass, said plow structure being adjustably mounted on said body.

2. An edge trimming machine for lawns, comprising a shearing structure, said structure including a straight knife, traction operated means for actuating said shearing structure, a bar carried by said knife extending beyond the front end of said shearing structure, a rotatable cutting disk carried by said bar at its front end, a plow arranged substantially in line with said cutting disk for throwing the earth to one side, adjustable securing means for holding said plow in position, said securing means including a sliding slotted bar and a clamping bolt, said bar being slidable in such a direction as to vary the depth of said plow, and a handle for moving the shearing structure, cutting disk, traction means and plow along simultaneously.

ALBERT W. MARSIK.